US011837874B2

(12) United States Patent
Hwang et al.

(10) Patent No.: US 11,837,874 B2
(45) Date of Patent: Dec. 5, 2023

(54) WIRELESS CHARGING DEVICE

(71) Applicant: LG Electronics Inc., Seoul (KR)

(72) Inventors: Joosung Hwang, Seoul (KR); Dmitry Nemirich, Seoul (KR); Roman Salimov, Seoul (KR)

(73) Assignee: LG Electronics Inc., Seoul (KR)

( * ) Notice: Subject to any disclaimer, the term of this patent is extended or adjusted under 35 U.S.C. 154(b) by 378 days.

(21) Appl. No.: 17/295,809

(22) PCT Filed: Nov. 18, 2019

(86) PCT No.: PCT/KR2019/015782
§ 371 (c)(1),
(2) Date: May 20, 2021

(87) PCT Pub. No.: WO2020/105994
PCT Pub. Date: May 28, 2020

(65) Prior Publication Data
US 2022/0029455 A1    Jan. 27, 2022

(30) Foreign Application Priority Data
Nov. 20, 2018 (KR) .......................... 10-2018-0143347

(51) Int. Cl.
*H02J 50/00* (2016.01)
*H02J 50/12* (2016.01)
(Continued)

(52) U.S. Cl.
CPC .......... *H02J 50/005* (2020.01); *H01Q 1/3275* (2013.01); *H01Q 1/38* (2013.01);
(Continued)

(58) Field of Classification Search
CPC .......... H02J 50/12; H02J 50/10; H02J 50/005; H02J 50/23; H01Q 1/38; H01Q 1/48;
(Continued)

(56) References Cited

U.S. PATENT DOCUMENTS

2004/0169609 A1    9/2004   Song et al.
2010/0231462 A1    9/2010   Tran
(Continued)

FOREIGN PATENT DOCUMENTS

KR   20150114871     10/2015
KR   20160114884     10/2016
WO   WO2016153169    9/2016

OTHER PUBLICATIONS

Extended European Search Report in European Appln. No. 19886535.4, dated Jul. 14, 2022, 7 pages.
(Continued)

*Primary Examiner* — Ryan Johnson
(74) *Attorney, Agent, or Firm* — Fish & Richardson P.C.

(57) ABSTRACT

A wireless charging device includes: a power transmission coil for wirelessly transmitting power to an external terminal, and a re-radiation antenna for receiving an antenna signal and re-radiating same. The re-radiation antenna comprises an insulation plate, and a radiation pattern part which is formed on one surface of the insulation plate, and which is arranged along the outer circumference of the insulation plate so that one end and the other end thereof are arranged to be adjacent to each other, and the radiation pattern part includes a first extension pattern in a quarter-ellipse shape, extending in the lateral direction of the insulation plate from a position adjacent to the one end of the radiation pattern
(Continued)

part, and a second extension pattern in a quarter-ellipse shape, symmetrical to the first extension pattern, at a position adjacent to the other end of the radiation pattern.

20 Claims, 16 Drawing Sheets

(51) Int. Cl.
  *H01Q 1/32* (2006.01)
  *H01Q 1/38* (2006.01)
  *H01Q 1/48* (2006.01)
  *H01Q 7/00* (2006.01)
(52) U.S. Cl.
  CPC .............. *H01Q 1/48* (2013.01); *H01Q 7/00* (2013.01); *H02J 50/12* (2016.02)
(58) Field of Classification Search
  CPC .......... H01Q 7/00; H01Q 1/36; H01Q 1/3275; H01Q 1/3291; H04B 7/14; H04B 7/145; H04B 7/15
  See application file for complete search history.

(56) References Cited

U.S. PATENT DOCUMENTS

| | | | |
|---|---|---|---|
| 2013/0252661 A1* | 9/2013 | Holz | H04B 5/0037 455/552.1 |
| 2014/0139238 A1 | 5/2014 | Mukai et al. | |
| 2014/0169609 A1* | 6/2014 | Rickards | H04R 1/028 381/375 |
| 2015/0288067 A1* | 10/2015 | Kwon | H01Q 9/0407 320/108 |
| 2015/0295322 A1* | 10/2015 | Asanuma | H01Q 1/52 343/747 |
| 2018/0083493 A1* | 3/2018 | Hwang | H02J 50/12 |

OTHER PUBLICATIONS

International Search Report in International Appln. No. PCT/KR2019/015782, dated Mar. 19, 2020, 5 pages (with English translation).
Kavitha et al., "A Wide-scan Phased Array Antenna for a small Active Electronically Scanned Array: A Review," International Conference on Circuits, Power and Computing Technologies, 2013, 1008-1016.

* cited by examiner

Fig. 15
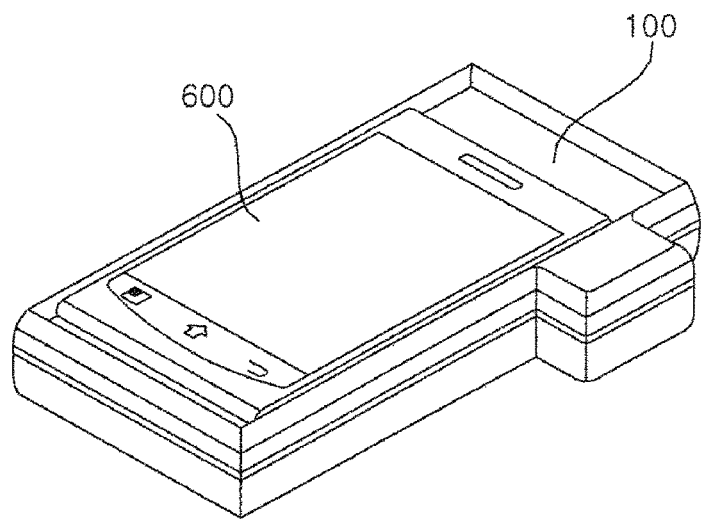
(a)
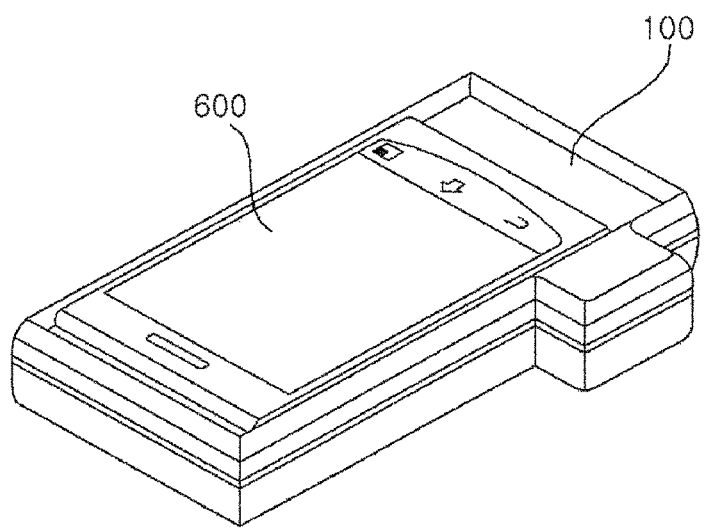
(b)

| BAND | | Phone Position | |
|---|---|---|---|
| | | Forward | Reverse |
| LTE 800 | Up Link | 14.5 | 10.0 |
| | Down Link | 11.7 | 11.4 |
| LTE 900 | Up Link | 13.7 | 10.9 |
| | Down Link | 12.0 | 13.0 |
| LTE 1800 | Up Link | 18.4 | 19.4 |
| | Down Link | 19.6 | 14.9 |
| LTE 2100 | Up Link | 27.3 | 14.9 |
| | Down Link | 12.3 | 12.3 |
| LTE 2600 | Up Link | 17.5 | 25.3 |
| | Down Link | 17.2 | 17.8 |
| AVERAGE: | | 15.7 dB | |

(b)

| BAND | | Phone Position | |
|---|---|---|---|
| | | Forward | Reverse |
| LTE 800 | Up Link | 14.4 | 8.1 |
| | Down Link | 11.0 | 9.4 |
| LTE 900 | Up Link | 9.3 | 8.9 |
| | Down Link | 10.4 | 12.4 |
| LTE 1800 | Up Link | 19.5 | 13.3 |
| | Down Link | 16.3 | 10.9 |
| LTE 2100 | Up Link | 14.4 | 14.1 |
| | Down Link | 14.9 | 14.6 |
| LTE 2600 | Up Link | 11.4 | 21.5 |
| | Down Link | 13.8 | 20.2 |
| AVERAGE: | | 13.4 dB | |

# WIRELESS CHARGING DEVICE

CROSS-REFERENCE TO RELATED APPLICATIONS

This application is a National Stage application under 35 U.S.C. § 371 of International Application No. PCT/KR2019/015782, filed on Nov. 18, 2019, which claims the benefit of Korean Patent Application No. 10-2018-0143347, filed on Nov. 20, 2018. The disclosures of the prior applications are incorporated by reference in their entirety.

BACKGROUND OF THE DISCLOSURE

Field of the Disclosure

The present disclosure relates to a wireless charging device and, more particularly, to a wireless charging device capable of improving the uniformity of an electric field distribution of a re-radiation antenna while not deteriorating wireless charging performance.

Related Art

A wireless charging device for a mobile terminal is introduced to the market. Furthermore, a wireless charging device for a mobile terminal included in a vehicle is developed.

Meanwhile, as a high-rise building and an internal space recently become more complicated, a shadow area in which a radio wave environment is poor in a wireless communication system occurs all over within a building. Furthermore, if the wireless charging device is located within a vehicle, transmission and reception rates of radio waves are reduced because the wireless charging device itself is generally made of metal.

In order to solve such a problem, attempts to retransmit a wireless communication signal are recently made by disposing a re-radiation antenna in a wireless charging device included in a vehicle. However, a conventional re-radiation antenna pattern has problems in that a shadow area occurs even within a vehicle due to low electric field distribution uniformity and even wireless charging efficiency is deteriorated due to interference with a power transmission coil.

SUMMARY

An object of the present disclosure is to provide a wireless charging device capable of improving the uniformity of an electric field distribution of a re-radiation antenna.

Another object of the present disclosure is to provide a wireless charging device which does not deteriorate wireless charging efficiency while improving the uniformity of an electric field distribution of a re-radiation antenna.

Still another object of the present disclosure is to provide a wireless charging device capable of guaranteeing communication efficiency having a specific reference or more regardless of the direction of an external terminal.

A wireless charging device according to an embodiment of the present disclosure includes a power transmission coil wirelessly transmitting power to an external terminal and a re-radiation antenna receiving an antenna signal and re-radiating the antenna signal. The re-radiation antenna includes an insulating plate, and a radiation pattern unit formed on one surface of the insulating plate, disposed along an outer circumference of the insulating plate, and having one end and the other end thereof disposed adjacent to each other. The radiation pattern unit includes a first extension pattern having a quarter ellipse shape and elongated in a direction lateral to the insulating plate at a location adjacent to the one end of the radiation pattern unit, and a second extension pattern having a quarter ellipse shape and being symmetrical to the first extension pattern at a location adjacent to the other end of the radiation pattern.

Advantageous Effects

The re-radiation antenna within the wireless charging device according to an embodiment of the present disclosure includes the radiation pattern unit disposed along the outer circumference of the insulating plate and having one end and the other end thereof disposed adjacent to each other. The radiation pattern unit includes the first extension pattern having the quarter ellipse shape and elongated in the direction lateral to the insulating plate at the location adjacent to the one end of the radiation pattern unit and the second extension pattern having the quarter ellipse shape and being symmetrical to the first extension pattern at the location adjacent to the other end of the radiation pattern. Accordingly, the re-radiation antenna has effects in that wide band communication is possible and the uniformity of an electric field distribution is improved.

Furthermore, the re-radiation antenna within the wireless charging device has effects in that the intensity of an electric field is increased and an electrical length is corrected by a plurality of slit shapes formed in the first extension pattern and the second extension pattern.

Likewise, a second tape pattern disposed along the top circumference of the insulating plate also includes a plurality of slit shapes, thereby increasing the intensity of an electric field of the antenna and also correcting the electrical length.

Furthermore, the re-radiation antenna within the wireless charging device has an effect in that the length of the antenna is increased because the re-radiation antenna includes a meander pattern that is curved at least two.

Furthermore, the re-radiation antenna within the wireless charging device can remove a shadow area by improving the uniformity of an electric field distribution.

Furthermore, the re-radiation antenna within the wireless charging device does not deteriorate wireless charging efficiency through a through hole structure formed in the insulating plate.

Furthermore, in the re-radiation antenna within the wireless charging device, the long-axis length and short-axis length of a quarter ellipse pattern can be designed by considering wireless charging efficiency. Likewise, a shape of the slit can be designed by considering wireless charging efficiency.

Furthermore, the re-radiation antenna within the wireless charging device can guarantee communication efficiency having a given reference or more regardless of the direction of an external terminal because the width of the second tape pattern disposed along the top circumference of the insulating plate is greater than that of each of a first tape pattern and a third tape pattern disposed on the circumference of the insulating plate on both sides thereof.

BRIEF DESCRIPTION OF THE DRAWINGS

FIG. 15 is a diagram illustrating the state in which the wireless charging device has been held in an external terminal.

FIG. 16 is a diagram for a comparison of communication efficiency in a direction in which the external terminal is held.

DESCRIPTION OF EXEMPLARY EMBODIMENTS

Hereinafter, the present disclosure is described more specifically with reference to the drawings.

The suffixes of elements used in the following description, such as a "module" and a "unit", are assigned by taking into consideration only the ease of writing this specification, but in themselves are not particularly given distinct meanings and roles. Accordingly, the "module" and the "unit" may be interchangeably used.

Terms, such as "first" and "second", may be used to describe various elements, but the elements are not restricted by the terms. The terms are used to only distinguish one element from the other element.

It is to be understood that in this application, a term, such as "include" or "have", is intended to indicate the existence of a characteristic, number, step, operation, element, or component or a combination of them in the specification and does not exclude the existence of one or more other characteristics, numbers, steps, operations, elements, or components or a combination of them or the possibility addition of them.

Figure 1:
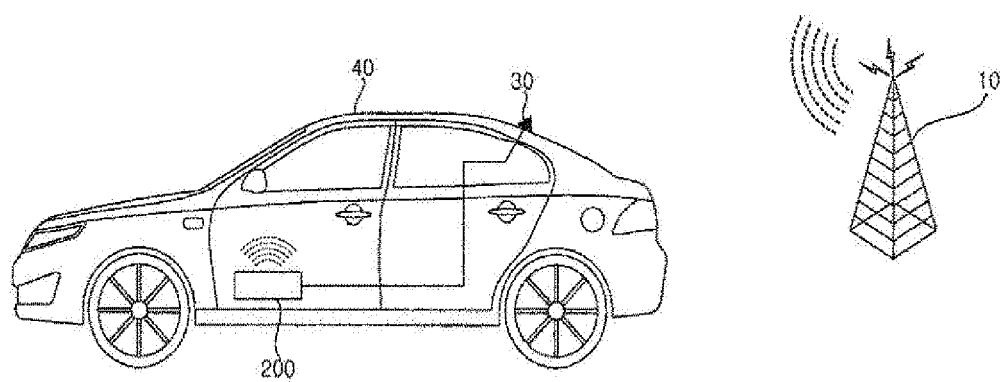
FIG. 1 is a diagram for describing a concept of a re-radiation antenna of the present disclosure.

FIG. 1 is a diagram for describing a concept of a re-radiation antenna of the present disclosure.

Description is given with reference to this drawing. The radio wave transmission and reception rates of an external terminal (600 in FIG. 2) located within a building or a vehicle 40 may be significantly deteriorated because the radio wave transmitted by a base station 10 collides against the building or shielded by metal that forms the exterior of the vehicle 40.

A place where a radio wave is not partially reached as described above is called a shadow area. In order to increase the transmission and reception rates of radio waves in the shadow area, a wireless charging device 100 within the vehicle 40 may be equipped with a re-radiation antenna 200.

Specifically, the vehicle 40 includes an external antenna 30 on the outside thereof. The external antenna 30 may amplify a received signal and transmit the amplified signal to the terminal 600 located within the vehicle 40 through the re-radiation antenna 200 within the vehicle 40. Accordingly, the transmission and reception rates of radio waves of the terminal 600 may be increased.

However, the re-radiation antenna 200 has a great influence on surrounding devices because it transmits and receives signals by using an electromagnetic wave. Accordingly, when a relation with the surrounding devices is considered, the re-radiation antenna 200 needs to be disposed at a location where the surrounding devices are less influenced. However, if a distance between the re-radiation antenna 200 and the terminal 600 is great, there is a problem n that performance of the re-radiation antenna 200 is also deteriorated. A re-radiation antenna capable of minimizing the influence of the re-radiation antenna 200 and a surrounding device while reducing the distance from the terminal 600 is researched.

Figure 2:
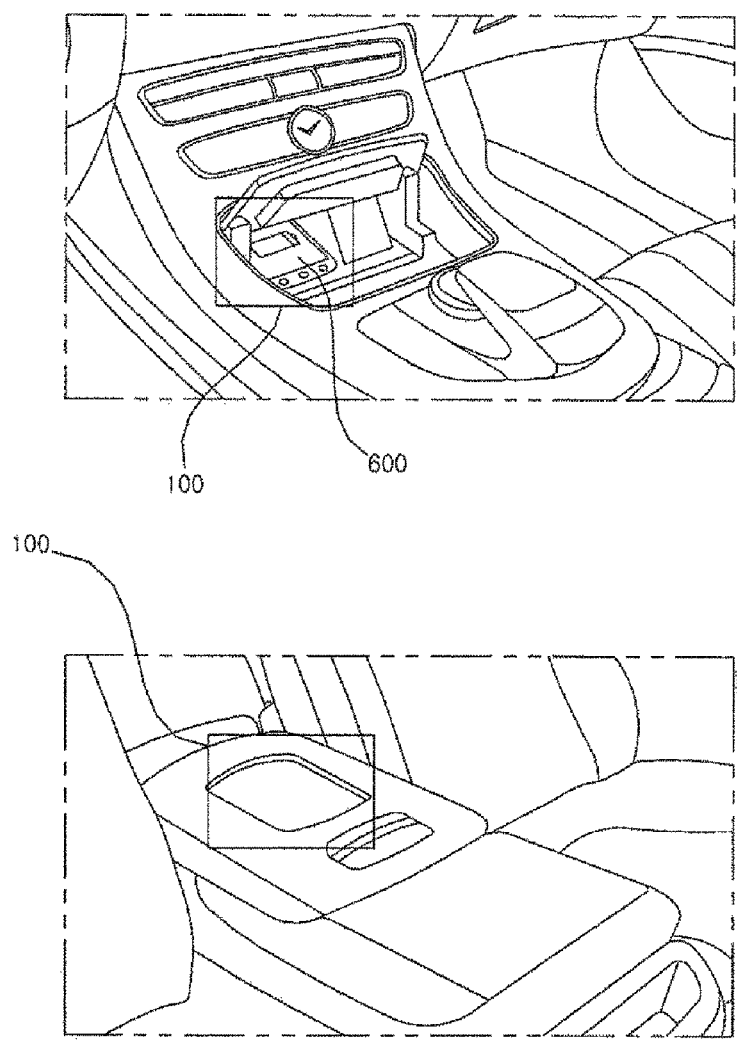
FIG. 2 is a diagram illustrating the state in which a wireless charging device of the present disclosure has been held in a vehicle.

FIG. 2 is a diagram illustrating the state in which the wireless charging device of the present disclosure has been held in a vehicle.

Description is given with reference to this drawing. The wireless charging device 100 for charging the external terminal 600 by using a wireless charging method emerges. The wireless charging method has an advantage in that the external terminal 600 is charged by only holding the terminal 600 on the wireless charging device 100 without connecting the wireless charging device 100 and the external terminal 600 through a cable.

In this case, the external terminal 600 may be a mobile phone communicating with the base station 10.

The wireless charging device 100 may be disposed within a vehicle.

Meanwhile, in general, the external terminal 600 is used in the state in which the external terminal 600 has been held on the wireless charging device 100 in the vehicle 40 equipped with the wireless charging device 100. Furthermore, there is a good possibility that a call will be made in a hands-free way by using a Bluetooth function in the state in which the external terminal 600 has been held on the wireless charging device 100 upon call.

In order for the re-radiation antenna 200 to transmit a communication signal to the external terminal 600 while minimizing a signal loss, it is advantageous when a distance between the re-radiation antenna 200 and the external terminal 600 is close.

Accordingly, the re-radiation antenna 200 may include the wireless charging device 100 therein for communication efficiency. In this case, the wireless charging device 100 can re-radiate a communication signal while wirelessly charging the external terminal 600.

As in FIG. 2, the wireless charging device 100 may be disposed in one area of a center console, one area of a center fascia, one area of a globe compartment or one area of a dashboard.

Alternatively, the wireless charging device 100 may be disposed in one area of the armrest of a rear seat.

Figure 3:
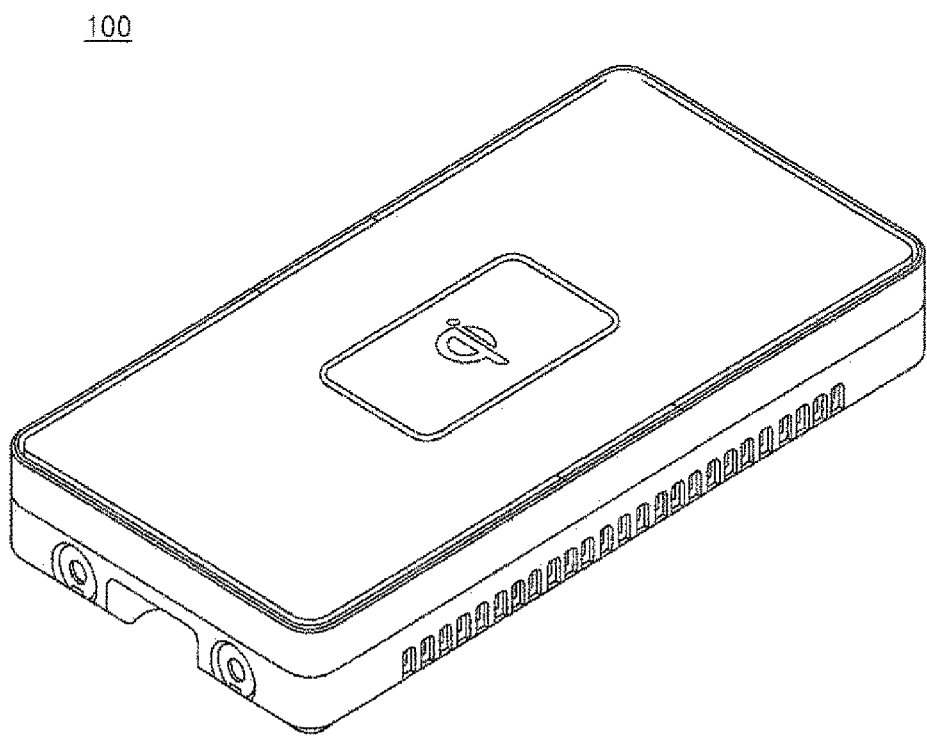
FIG. 3 is a perspective view of the wireless charging device according to an embodiment of the present disclosure.
Figure 4:
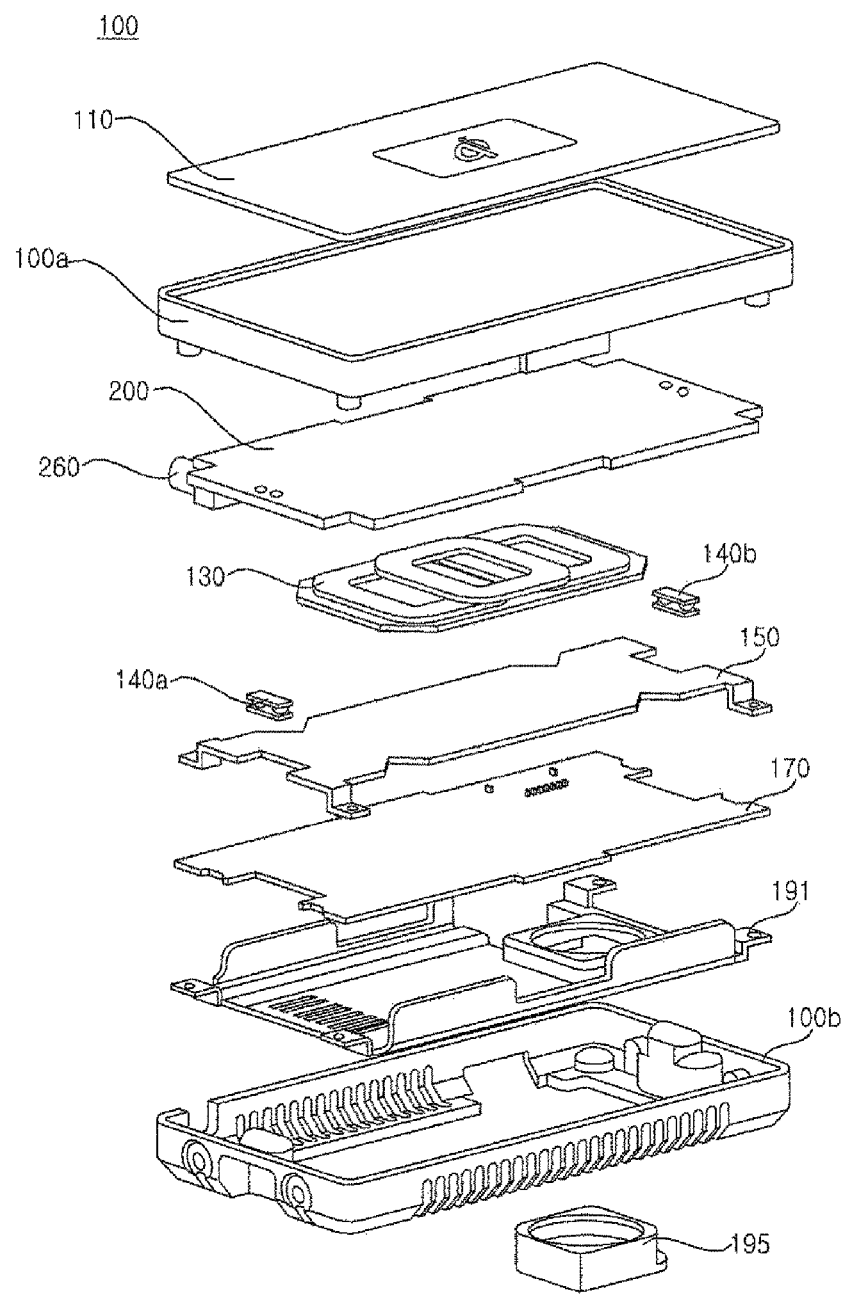
FIG. 4 is an exploded perspective view of the wireless charging device according to an embodiment of the present disclosure.

FIG. 3 is a perspective view of the wireless charging device according to an embodiment of the present disclosure. FIG. 4 is an exploded perspective view of the wireless charging device according to an embodiment of the present disclosure.

Description is given with reference to this drawing. The wireless charging device 100 of the present disclosure may include housings 100a and 100b each having an electronic part therein, a printed circuit board 170 as a controller mounted within the housings, a shield can 150 protecting the printed circuit board, a power transmission coil 130 wirelessly transmitting power to the external terminal 600, and a re-radiation antenna 200 which receives an antenna signal and re-radiates the antenna signal.

Furthermore, the wireless charging device 100 may further include a heat sink 191 for emitting heat generated from the printed circuit board 170, the power transmission coil 130, the re-radiation antenna 200, etc. and a fan module 195 for reducing heat generated in a wireless charging process or re-radiation process by circulating internal air.

Furthermore, the wireless charging device 100 may further include a pad 110 on which the external terminal 600 is held.

The housings 100a and 100b may consist of an upper housing 100a and a lower housing 100b. The power transmission coil 130 and the re-radiation antenna 200 are mounted within the housings 100a and 100b. A terminal for supplying power to the power transmission coil 130 and a terminal for supplying the re-radiation antenna 200 with an antenna signal received through the external antenna 30 disposed outside the vehicle 40 may be exposed in the outside of the housings 100a and 100b.

The controller is the printed circuit board 170, and functions to be applied with external power and supply the external power to the power transmission coil 130 and to transmit, to the re-radiation antenna 200, a signal received from the external antenna 30.

The shield can 150 that radiates heat and provides a space where a part may be mounted thereon may be further included on the top of the printed circuit board 170.

An electromagnetic field is formed when a current flows into the power transmission coil 130 disposed over the printed circuit board 170. The external terminal 600 may be charged by the current that flows into the power reception coil of the external terminal 600 due to the electromagnetic field.

In the present embodiment, the power transmission coil 130 is disposed on the shield can 150. The power transmission coil 130 may be coupled to the shield can 150 by coupling members 140a and 140b.

The wireless charging method includes a magnetic resonance method and an electromagnetic induction method. The electromagnetic induction method is a method of charging an electronic device to be charged by using an induced current principle. A current flowing into the power transmission coil 140 mounted on a portable charging device forms an electromagnetic field. The current may flow into the power reception coil located within the electromagnetic field due to the electromagnetic field.

The magnetic resonance method is a charging method using a resonance method, that is, a phenomenon in which vibration is performed with great amplitude in a specific frequency, and uses a strong magnetic coupling phenomenon formed between the power transmission coil 130 and the power reception coil having the same resonant frequency.

The electromagnetic induction method has high efficiency, but the power transmission coil 130 and the power reception coil need to be disposed adjacent to each other. If the power transmission coil 130 and the power reception coil are isolated from each other or obliquely disposed, efficiency is greatly deteriorated. Accordingly, an arrangement between the power transmission coil 130 and the power reception coil is very important in charging using the electromagnetic induction method.

In contrast, the magnetic resonance method has lower efficiency than the electromagnetic induction method, but has an advantage in that the use of the magnetic resonance method is not limited because charging is possible although the power transmission coil 130 and the power reception coil are isolated from each other. Furthermore, there is an advantage in that an unused energy portion is absorbed again as an electric field.

The wireless charging device 100 may further include a ferrite sheet at the top or bottom of the power transmission coil 130. The ferrite sheet can improve a circuit flow of the flux lines of the coil, and can reduce the amount of electromagnetism radiated from the power transmission coil 130.

The heat sink 191 may radiate internal heat. The heat sink 191 may be made of a metal material. For example, the heat sink 191 may be made of an aluminum material.

The fan module 195 is coupled to the heat sink 191, and may discharge internal heat to the outside or absorb external heat into the inside thereof. Accordingly, the generation of heat in the wireless charging device 100 can be reduced.

The fan module 195 includes at least fan. For example, the fan may be any one of a rotating fan, a solid state fan, a piezoelectric fan, a blower fan, an axial-flow fan, or a mixed flow fan.

Meanwhile, in order to reduce vibration and noise occurring due to an operation of the fan, a dustproof material may be applied to the fan included in the fan module 195 and a portion that comes into contact with another part.

The pad 110 may be made of a material having a high frictional force (e.g., non-woven fabric, silicon, or rubber) so that the external terminal 600 does not deviate from the wireless charging device 100.

Furthermore, the pad 110 may be made of a nonmetallic material by considering wireless power transmission, a communication signal radiation, etc.

Meanwhile, as illustrated in FIG. 4, if the re-radiation antenna 200 is disposed on the top of the power transmission coil 130, there is a power transmission efficiency issue through the power transmission coil 130.

The re-radiation antenna 200 which increases communication efficiency while not deteriorating power transmission efficiency of the wireless charging device 100 is described below.

Figure 5:
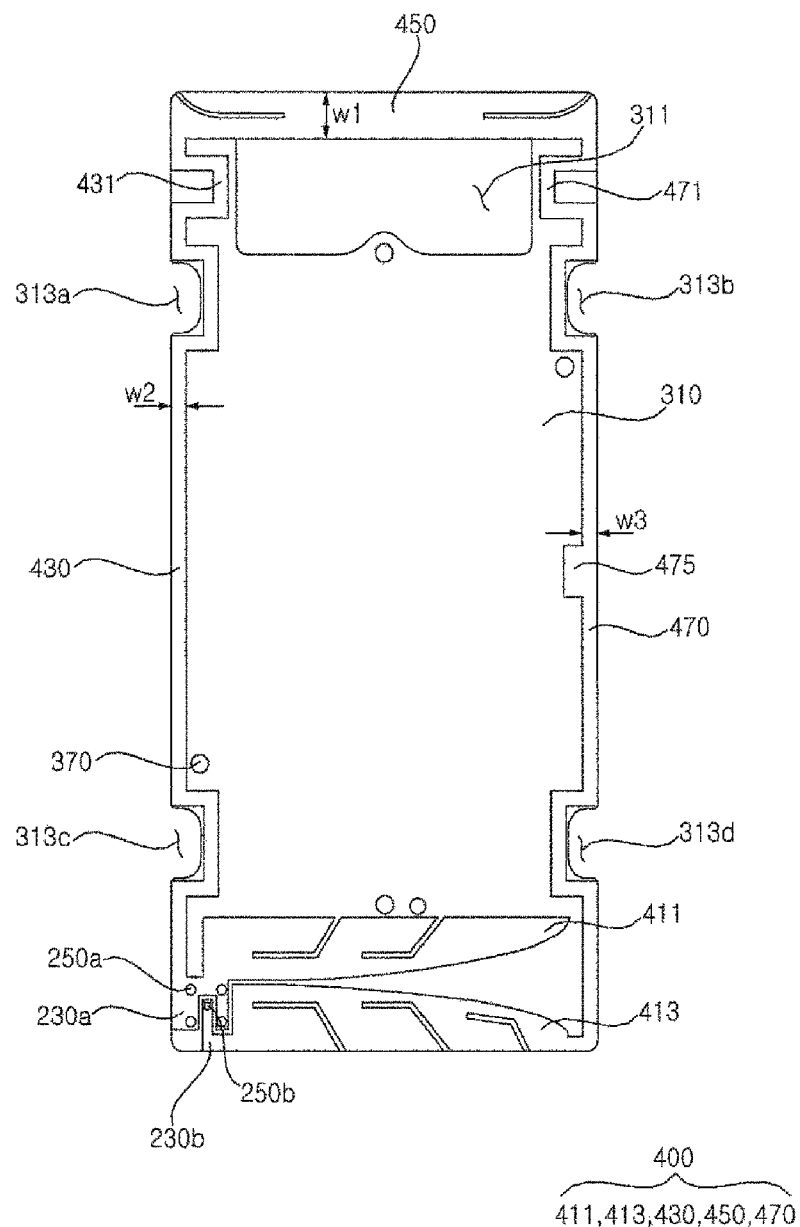
FIG. 5 is a diagram illustrating an embodiment of a re-radiation antenna within the wireless charging device according to an embodiment of the present disclosure.

FIG. 5 is a diagram illustrating an embodiment of the re-radiation antenna within the wireless charging device according to an embodiment of the present disclosure.

Description is given with reference to this drawing. The re-radiation antenna 200 according to an embodiment of the present disclosure may include an insulating plate 310 and a radiation pattern unit 400 formed in one surface of the insulating plate 310, disposed along the outer circumference of the insulating plate 310, and having one end and the other end thereof disposed adjacent to each other.

Furthermore, the re-radiation antenna 200 may further include a ground unit connected to one end 230a of the radiation pattern unit 400 and a power supply unit which is connected to the other end 230b of the radiation pattern unit 400 and supplies power.

The insulating plate 310 is a sheet-shaped member made of a non-conductive material, and may be made of epoxy, such as FR-4, fiberglass, etc.

The insulating plate 310 may be generally formed in a quadrangle shape. Furthermore, the insulating plate 310 may have a plurality of given areas removed from the quadrangle shape.

Specifically, the insulating plate 310 may include a plurality of opening units 313a, 313b, 313c, and 313d, each one having a quadrangle shape, but penetrated up and down at a location isolated from each edge portion of the quadrangle at a given interval and laterally opened.

The first opening unit 313a and the second opening unit 313b may be formed at respective locations isolated from each other at a first isolated distance in a downward direction in both edges on the upper side of the insulating plate 310.

The third opening unit 313c and the fourth opening unit 313d may be formed at respective locations isolated from each other at a second isolated distance in an upward direction in both edges on the lower side of the insulating plate 310.

Support members may be coupled to the opening units 313a, 313b, 313c, and 313d, respectively, so the re-radiation antenna 200 can be stably seated in the wireless charging device 100.

Furthermore, if the plurality of opening units 313a, 313b, 313c, and 313d is disposed at the boundary of the insulating plate 310, when bending occurs in the insulating plate 310, the occurrence of a crack can be prevented because stress concentrated on the boundary of the radiation pattern unit 400 is distributed in all directions.

Meanwhile, shapes of the plurality of opening units 313a, 313b, 313c, and 313d may be variously changed.

The insulating plate 310 may further include a through hole 311 at the upper side thereof. As the insulating plate 310 includes the through hole 311, transmission efficiency of wireless power transmission can be increased.

The insulating plate 310 may include a plurality of screw holes 370.

The radiation pattern unit 400 may function to receive, from a power supply unit, a current corresponding to a communication signal and to re-radiate the communication signal. The communication signal is radiated through the re-radiation antenna 200. Hereinafter, a communication signal and an antenna signal may be interchangeably used.

An antenna signal may be a communication signal using a global system for mobile communication (GSM), universal mobile telecommunications system (UMTS), or long term evolution (LTE) method, for example, but the present disclosure is not limited thereto. Any signals exchanged between the external terminal 600 and the base station 10 may be used as antenna signals.

The radiation pattern unit 400 generally has an open type loop shape, and may have both ends adjacently disposed. Furthermore, the radiation pattern unit 400 may be disposed along the outer circumference of the insulating plate 310.

In the radiation pattern unit 400, a middle portion of the insulating plate 310 may be emptied in order to prevent power transmission efficiency of the power transmission coil 130, disposed under the re-radiation antenna 200, from being deteriorated.

As in FIG. 5, the re-radiation antenna 200 of the present disclosure does not have a conductive material in a middle portion thereof, so a magnetic field generated from the power transmission coil 130 can reach the wireless power reception coil of the terminal 600 seated on the top of the wireless charging device 100 without interruption.

The length of the radiation pattern unit 400 may be different depending on the length of a wavelength of a signal to be transmitted or received.

A pattern of the radiation pattern unit 400 may be formed by an exposure or etching method or may be formed by a printing method using a printer.

The radiation pattern unit 400 may be a monopole antenna, which is formed of a conductor made of a conductive material and has a type in which a signal is received through one side thereof.

The radiation pattern unit 400 may include a first tape pattern 430, a second tape pattern 450 and a third tape pattern 470 disposed along the outer circumference of the insulating plate 310. Furthermore, the radiation pattern unit 400 may further include extension patterns 411 and 413 transversely elongated along the outer circumference of the insulating plate at respective locations having both ends adjacently disposed.

The first extension pattern 411 may be formed in a quarter ellipse shape elongated in a direction lateral to the insulating plate 310 at a location adjacent to the one end 230a of the radiation pattern unit 400.

The second extension pattern 413 may be formed in a quarter ellipse shape symmetrical to the first extension pattern 411 at a location adjacent to the other end 230b of the radiation pattern unit 400.

The first extension pattern 411 and the second extension pattern 413 may be formed in the respective quarter ellipse shapes symmetrical to each other with respect to a virtual line elongated in a direction lateral to a ground hole 250a to be described later.

The first extension pattern 411 and the second extension pattern 413 may be symmetrically formed so that curved portions of the quarter ellipse shapes face each other.

A quarter ellipse may correspond to a figure obtained by dividing an ellipse into four equal parts by using the long axis and short axis of the ellipse as a boundary.

Each of the first extension pattern 411 and the second extension pattern 413 is formed similar to a vivaldi antenna pattern, so the wireless charging device 100 may have a high radiation gain, a wide beam width, and a wide bandwidth.

The first extension pattern 411 and the second extension pattern 413 are disposed closely to the power supply unit to be described later, and may be elongated from locations adjacent to both ends of the loop type radiation pattern unit 400 in order to improve antenna performance.

Furthermore, as in FIG. 15, an antenna mounted on the external terminal 600 is basically disposed on the top or bottom. In particular, since a main antenna used for mobile communication is disposed at the lower end of the external terminal 600, it is preferred that the first extension pattern 411 and the second extension pattern 413 are disposed on the lower side of the insulating plate 310.

In order to dispose the first extension pattern 411 and the second extension pattern 413 on the lower side of the loop type radiation pattern unit 400, both ends 230a and 230b of the radiation pattern unit 400 are disposed on the lower side of the insulating plate 310. In particular, in order to secure the lengths of the first extension pattern 411 and the second extension pattern 413, both ends 230a and 230b of the radiation pattern unit 400 may be disposed at lower edge portions of the insulating plate 310.

That is, the one end 230a and the other end 230b of the radiation pattern unit 400 may be disposed adjacent to a one-side edge at the lower side of the insulating plate 310. The first extension pattern 411 and the second extension pattern 413 may be transversely elongated toward the other side of the lower side of the insulating plate 310.

The first tape pattern 430, the second tape pattern 450, and the third tape pattern 470 may be formed in a tape form in order to empty the middle portion of the insulating plate 310.

The first tape pattern 430 may be longitudinally elongated along a one-side circumference of the insulating plate 310 from the one end 230a of the radiation pattern unit 400.

The second tape pattern 450 may be transversely elongated along an top circumference of the insulating plate 310 from the first tape pattern 430.

The third tape pattern 470 may be longitudinally elongated along the other-side circumference of the insulating plate 310 from the second tape pattern 450. The third tape pattern 470 may be electrically connected to the second extension pattern 413.

In the drawing, it has been illustrated that the first tape pattern 430 is disposed on the left side of the insulating plate 310 and the third tape pattern 470 is disposed on the right side of the insulating plate 310, but the right and left directions may be changed depending on an embodiment.

Meanwhile, in order to improve efficiency of coupling with the antenna disposed at the top or bottom of the external terminal 600, a width w1 of the second tape pattern 450 may be wider than each of a width w2 of the first tape pattern 430 and a width w3 of the third tape pattern 470.

That is, in order to improve efficiency of coupling with the external terminal 600, the thickness of a pattern disposed on the upper side of the re-radiation antenna 200 may be thicker.

The first tape pattern 430 and the third tape pattern 470 may include a first meander pattern 431 and a second meander pattern 471 formed in respective meander shapes in a bilateral symmetry manner with respect to a center line in the longitudinal direction of the insulating plate 310 on the upper side of the insulating plate 310.

The first meander pattern 431 may be formed in a "⊏" shape at a located adjacent to the second tape pattern 450. The second meander pattern 471 may be formed in a "⊐" shape symmetrically to the first meander pattern 431 at a location adjacent to the second tape pattern 450.

Each of the first meander pattern 431 and the second meander pattern 471 may be formed in the meander shape which is bent toward the through hole 311 to the maximum extent possible within a range that does not affect wireless power transmission.

The first meander pattern 431 and the second meander pattern 471 have the same length. The numbers of times that the first meander pattern 431 and the second meander pattern 471 are bent are the same. Frequencies that resonate in the first meander pattern 431 and the second meander pattern 471 are different depending on the lengths of the first meander pattern 431 and the second meander pattern 471.

The third tape pattern 470 may include at least one protrusion pattern 475 protruded in a direction toward the inside of the insulating plate 310 in the middle of the insulating plate 310.

The protrusion pattern 475 functions to correct an electrical length and increase the intensity of an electric field (E-field), and may finally perform tuning based on a width and length of the protrusion pattern 475. In this case, a plurality of the protrusion patterns 475 may be formed in the longitudinal direction of the third tape pattern 470, but the present disclosure is not limited thereto.

The ground unit may be connected to one end of the radiation pattern unit 400. The power supply unit may connect to the other end of the radiation pattern unit 400, and may apply a current to the radiation pattern unit 400.

In order to electrically connect one end of the radiation pattern unit 400 to the ground unit and the other end of the radiation pattern unit 400 to the power supply unit, a connector (260 in FIG. 4) may be used.

The connector 260 may be connected to the one end 230a and the other end 230b of the radiation pattern unit 400 through a pin.

In order for the connector 260 to be connected to the one end 230a and the other end 230b of the radiation pattern unit 400 through the pin, the ground hole 250a may be formed in the one end 230a of the radiation pattern unit 400, and a power hole 250b may be formed in the other end 230b thereof.

Figure 6:
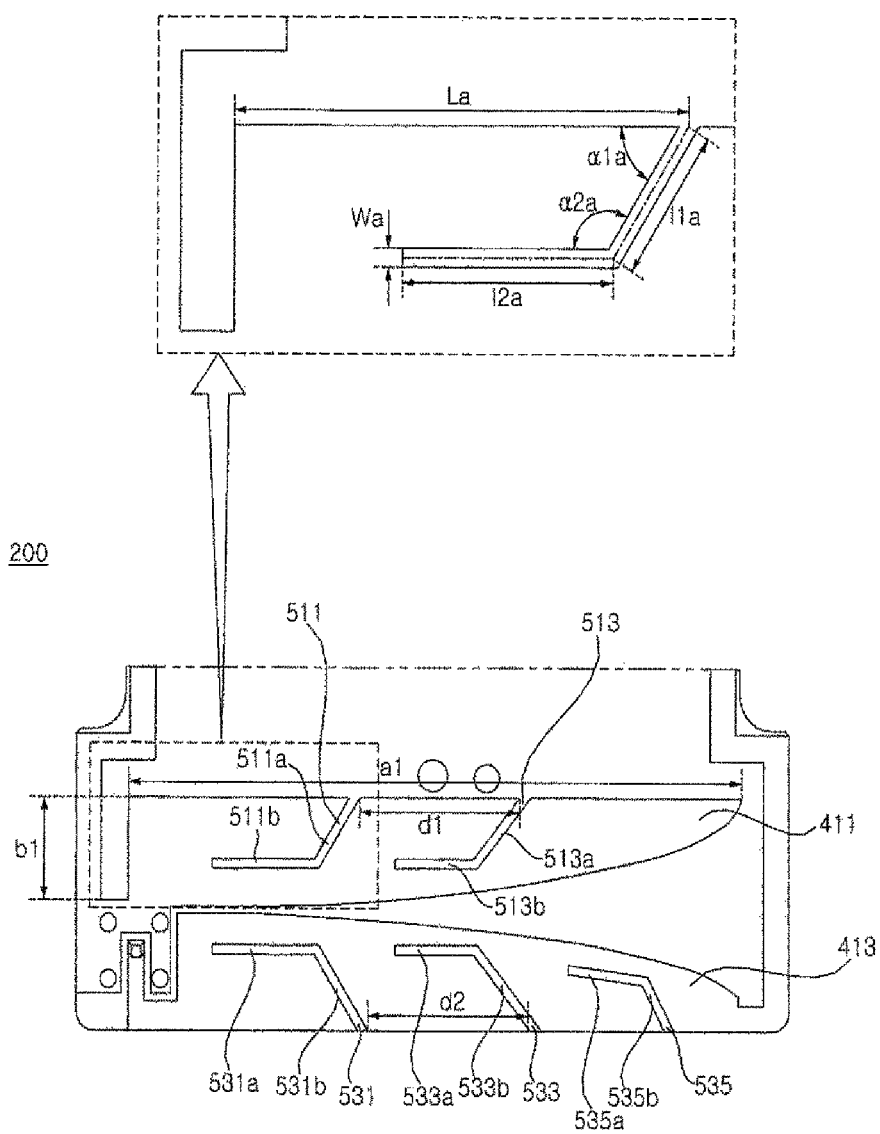
FIG. 6 is a diagram for describing a first extension pattern and second extension pattern of the re-radiation antenna of FIG. 5.

FIG. 6 is a diagram for describing the first extension pattern and second extension pattern of the re-radiation antenna of FIG. 5.

Description is given with reference to this drawing. Each of the first extension pattern 411 and the second extension pattern 413 may be formed in the quarter ellipse shape.

The first extension pattern 411 and the second extension pattern 413 may be formed in the quarter ellipse shapes having narrower widths, respectively, which become distant from both ends 230a and 230b of the radiation pattern unit 400.

A curve of the quarter ellipse may be an exponential curve shape.

A frequency bandwidth, a reflection characteristic, etc. of an antenna signal may be determined based on a long-axis length a1 and short-axis length b1 of the quarter ellipse.

The long-axis length of the first extension pattern 411 and the long-axis length of the second extension pattern 413 may be the same. Furthermore, the short-axis length of the first extension pattern 411 and the short-axis length of the second extension pattern 413 may be the same.

Narrow gaps for improving the uniformity of an electric field may be formed in the first extension pattern 411 and the second extension pattern 413. That is, the first extension pattern 411 and the second extension pattern 413 may include slits therein.

Such a slit has effects in that it corrects an electrical length and also increases the intensity of an electric field (E-field).

Specifically, the first extension pattern 411 may include a first main slit 511 and a second main slit 513 formed therein so that the insulating plate 310 is exposed.

The second extension pattern 413 may include a third main slit 531, a fourth main slit 533, and a fifth main slit 535 formed therein so that the insulating plate 310 is exposed.

The numbers of main slits formed in the first extension pattern 411 and the second extension pattern 413 may be different, but the present disclosure is not limited thereto.

The first extension pattern 411 disposed on the upper side may include a smaller number of the main slits 511 and 513, but the present disclosure is not limited thereto.

The first main slit 511 and the third main slit 531 disposed adjacent to the power supply unit may be symmetrically disposed to face each other. The second main slit 513 and the fourth main slit 533 may also be symmetrically disposed to face each other.

The first main slit 511 may include a first main exposure unit 511a elongated in a diagonal direction from a straight-line portion of the quarter ellipse shape and a second main exposure unit 511b elongated in a direction lateral to the insulating plate 310 from the first main exposure unit 511a.

The second main slit 513 may include a third main exposure unit 513a isolated from the first main exposure unit 511a at a first interval d1 and elongated in a diagonal direction from the straight-line portion of the quarter ellipse shape and a fourth main exposure unit 513b elongated in the direction lateral to the insulating plate 310 from the third main exposure unit 513a.

As the width of the first extension pattern 411 is narrowed as the first extension pattern 411 becomes distant from both ends 230a and 230b of the radiation pattern unit 400, it is advantageous when the diagonal direction in which each of the first main exposure unit 511a and the third main exposure unit 513a is elongated is the direction of both ends 230a and 230b of the radiation pattern unit 400.

Meanwhile, the third main slit 531 may include a fifth main exposure unit 531b elongated in a diagonal direction from the lower end of the insulating plate 310 and a sixth main exposure unit 531a elongated in the direction lateral to the insulating plate 310 from the fifth main exposure unit 531b.

The fourth main slit 533 may include a seventh main exposure unit 533b isolated from the fifth main exposure unit 531b at a second interval d2 and elongated in the diagonal direction from the lower end of the insulating plate 310 and an eighth main exposure unit 533a elongated in the direction lateral to the insulating plate 310 from the seventh main exposure unit 533b.

The fifth main slit 535 may include a ninth main exposure unit 535b isolated from the seventh main exposure unit 533b at the second interval d2 and elongated in the diagonal direction from the lower end of the insulating plate 310 and a tenth main exposure unit 535a obliquely elongated from the ninth main exposure unit 535b while forming an obtuse angle.

The first to fourth main slits 511, 513, 531, and 533 may be formed to have the same size. The fifth main slit 535 may be formed to have a smaller length than each of the first to fourth main slits 511, 513, 531, and 533, but the present disclosure is not limited thereto.

Since each of the first extension pattern 411 and the second extension pattern 413 has a shape having a width narrowed in the length direction, each of the plurality of main slits 511, 513, 531, 533, and 535 disposed in the length direction of the extension patterns 411 and 413 may be formed to have a size decreased in the length direction of the extension patterns 411 and 413.

As described above, the number of slits of the first extension pattern 411 may be smaller than the number of slits of the second extension pattern 413. This is for preventing transmission efficiency of wireless power from being decreased due to the slits included in the first extension pattern 411.

Meanwhile, since the width of the second extension pattern 413 is also narrowed as the second extension pattern 413 becomes distant from both ends 230a and 230b of the radiation pattern unit 400, it is advantageous when the diagonal direction in which each of the third main exposure unit 531b, the fifth main exposure unit 533b, and the seventh main exposure unit 535b are elongated is the direction of both ends 230a and 230b of the radiation pattern unit 400.

Furthermore, since the width of the second extension pattern 413 is narrowed as the second extension pattern 413 becomes distant from both ends 230a and 230b of the radiation pattern unit 400, it is preferred that the tenth main exposure unit 535a is obliquely elongated from the ninth main exposure unit 535b while forming an obtuse angle for the uniformity of an electric field.

Furthermore, for the uniformity of an electric field, the first interval d1 and the second interval d2 may be the same.

Meanwhile, lengths l1a and l2a and an exposure width Wa of the main exposure units, an angle $\alpha 1a$ formed by the straight-line portion of the quarter ellipse shape and the main exposure unit, and an angle $\alpha 2a$ between the main exposure units may be varied depending on an arrangement structure or size of the power transmission coil 130 and/or a structure and/or size of the power reception coil within the external terminal 600.

Figure 7:
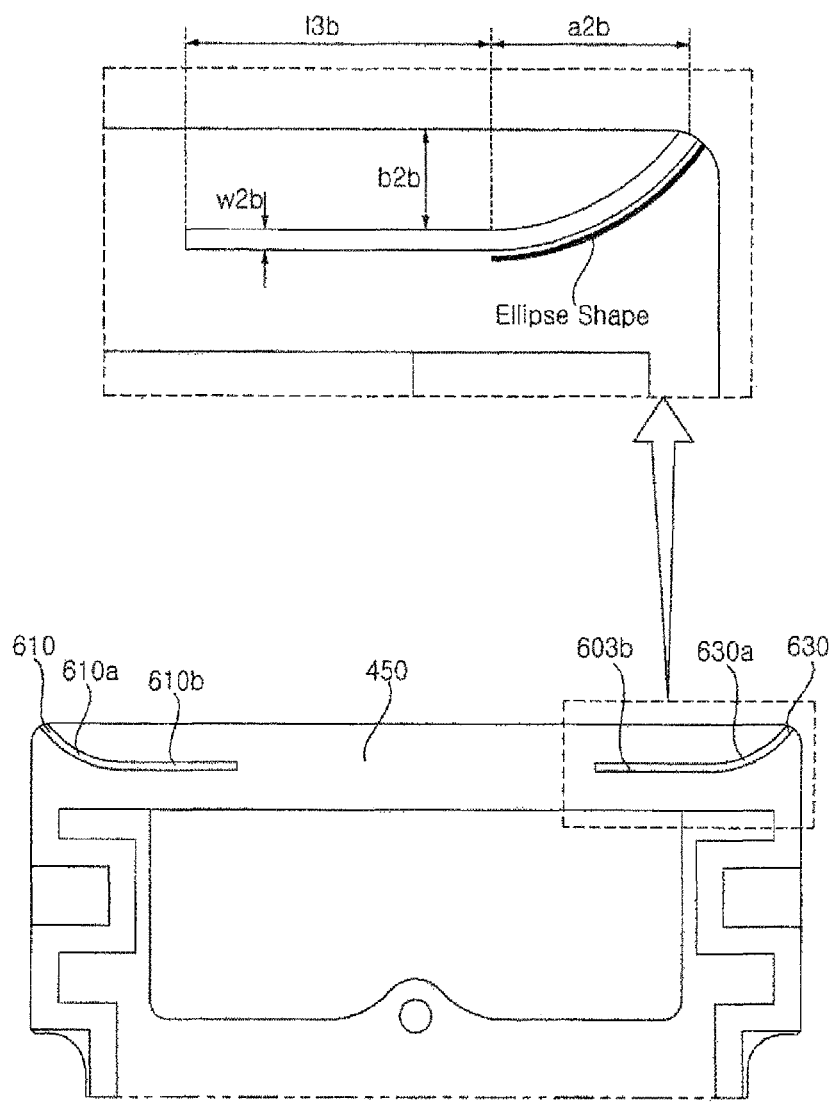
FIG. 7 is a diagram for describing a second tape pattern of the re-radiation antenna of FIG. 5.

FIG. 7 is a diagram for describing the second tape pattern of the re-radiation antenna of FIG. 5.

Description is given with reference to this drawing. The second tape pattern 450 may be disposed along the top circumference of the insulating plate 310.

The second tape pattern 450 may be thickly formed in order to improve efficiency of coupling with the external terminal 600.

The second tape pattern 450 may include a first assistant slit 610 and a second assistant slit 630 formed so that the insulating plate 310 is exposed.

As the first assistant slit 610 and the second assistant slit 630 are included in the second tape pattern 450, the intensity of an E-field in a high frequency region can be increased.

The first assistant slit 610 may include a first assistant exposure unit 610a elongated in a curve shape from one-side edge of the insulating plate 310 and a second assistant exposure unit 610b elongated in the direction lateral to the insulating plate 310 from the first assistant exposure unit 610a.

The second assistant slit 630 may include a third assistant exposure unit 630a elongated in a curve shape from the other-side edge of the insulating plate 310 and a fourth assistant exposure unit 630b elongated in the direction lateral to the insulating plate 310 from the third assistant exposure unit 630a.

As the first assistant exposure unit 610a and the third assistant exposure unit 630a are constructed in a curve shape, the intensity of an E-field in a high frequency region can be further increased.

Each of the first assistant exposure unit 610a and the third assistant exposure unit 630a may have a quadrant or a quarter ellipse shape.

Meanwhile, a long-axis length $a2h$, a short-axis length $b2b$, and an exposure width $w2b$ of the assistant exposure unit may be set by considering a reception frequency area of the external terminal 600.

Figure 8:
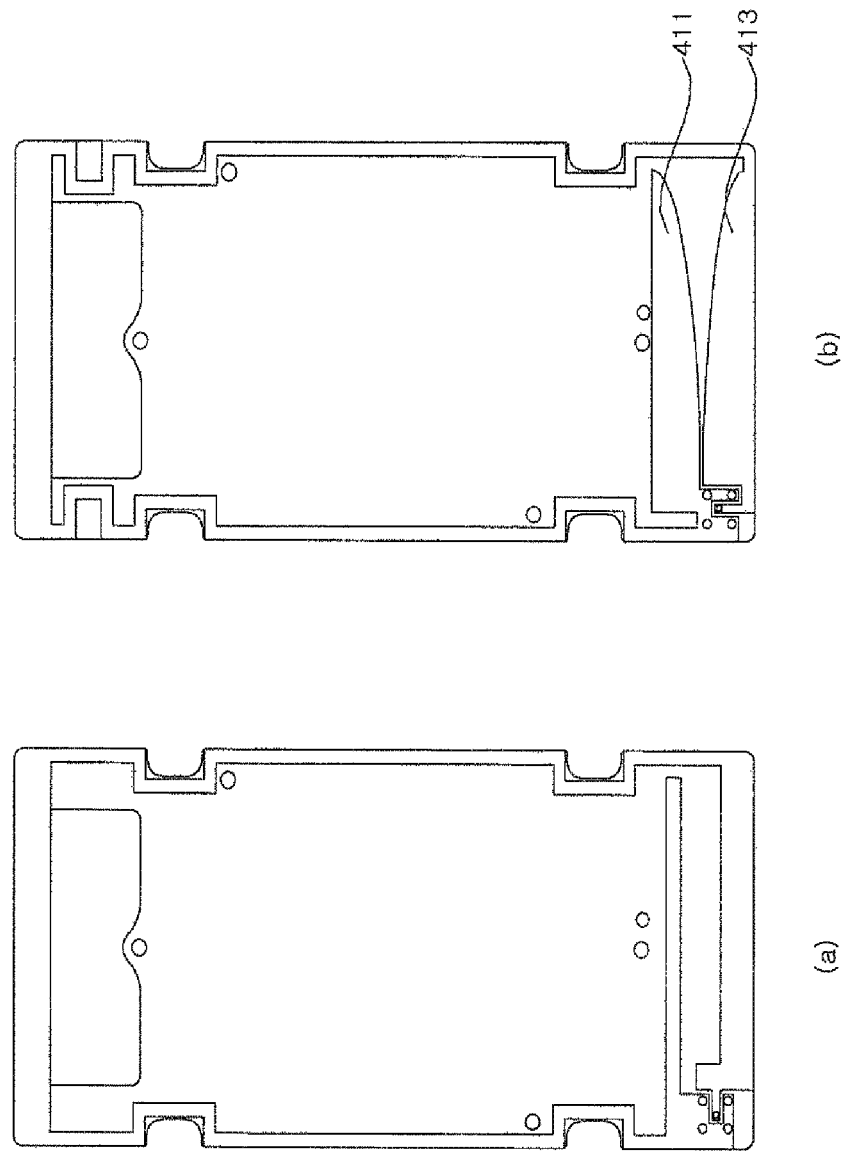
FIG. 8 is a diagram for describing effects of the first extension pattern and the second extension pattern each having a quarter ellipse shape, compared to a conventional re-radiation antenna pattern.
Figure 9:
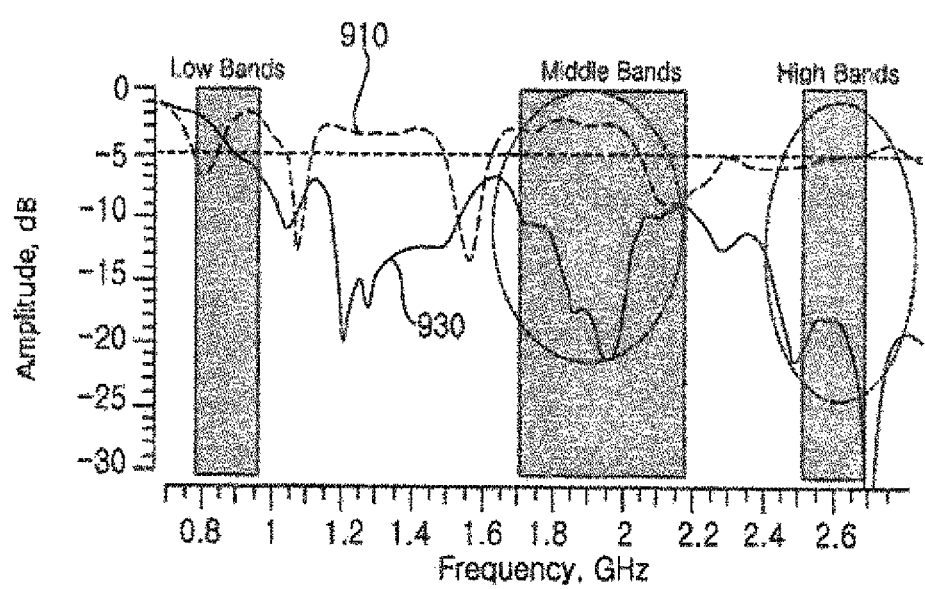
FIG. 9 is a diagram for describing an effect of the first extension pattern and the second extension pattern each having the quarter ellipse shape, compared to a conventional re-radiation antenna pattern.

FIGS. 8 and 9 are diagrams for describing effects of the first extension pattern and the second extension pattern each having a quarter ellipse shape, compared to a conventional re-radiation antenna pattern.

In a versatile aspect, it is preferred that the re-radiation antenna 200 can be applied to all communication standards that are different for each country.

For example, frequencies 850, 900, 1800, and 1900 MHz are used in the global system for mobile communication (GSM) method. Frequencies of 850 MHz, 900 MHz, and 2100 MHz are used in the universal mobile telecommunications system (UMTS). Frequencies of 850 MHz, 900 MHz, 1800 MHz, 2100 MHz and 2600 MHz are used in long term evolution (LTE).

The wireless charging device 100 of the present disclosure provides the re-radiation antenna 200 having a wide band.

Specifically, FIG. 8a is a diagram illustrating a pattern of a conventional re-radiation antenna. FIG. 8b is a diagram illustrating the first antenna pattern 411 and second antenna pattern 413 of the present disclosure.

Furthermore, FIG. 9 is a graph illustrating antenna performance of FIGS. 8a and 8b. A transverse axis indicates a frequency, and a longitudinal axis indicates a reflection coefficient (S-parameter).

In FIG. 9, when a ratio of the intensity of an incident signal and the intensity of a reflected and output signal is indicated as a decibel area, a reflection coefficient indicates a negative number because the intensity of the output signal is small. As the reflection coefficient is reduced, efficiency is high because the intensity of a reflected signal is further increased.

In FIG. 9, 910 denotes antenna performance of the re-radiation antenna pattern of FIG. 8a. 930 denotes antenna performance of the re-radiation antenna pattern of FIG. 8b.

In FIG. 9, since 930 is located below 910 more generally, it can be seen that the re-radiation antenna 200 of the present disclosure including the first antenna pattern 411 and the second antenna pattern 413 has better efficiency than the conventional re-radiation antenna.

Meanwhile, in FIG. 9, a peak component in a downward direction is related to a resonant frequency. A frequency corresponding to the peak component in the downward direction is a resonant frequency of the re-radiation antenna 200.

Furthermore, as the peak component in the downward direction is increased, it may be said that transmission efficiency is excellent in the resonant frequency.

In FIG. 9, it can be seen that 930 has more peak components in the downward direction than 910. In particular, in middle bands and high bands, a difference between 910 and 930 is significant.

That is, it can be seen that 910 does not have a peak component in the middle bands and the high bands, whereas 930 has multiple peak components in the middle bands and the high bands.

This reveals that the re-radiation antenna 200 of the present disclosure including the first antenna pattern 411 and the second antenna pattern 413 can be applied to more various frequency bands compared to the conventional re-radiation antenna.

As a result, the wireless charging device 100 of the present disclosure can provide the re-radiation antenna 200 having a wide band.

Figure 10:
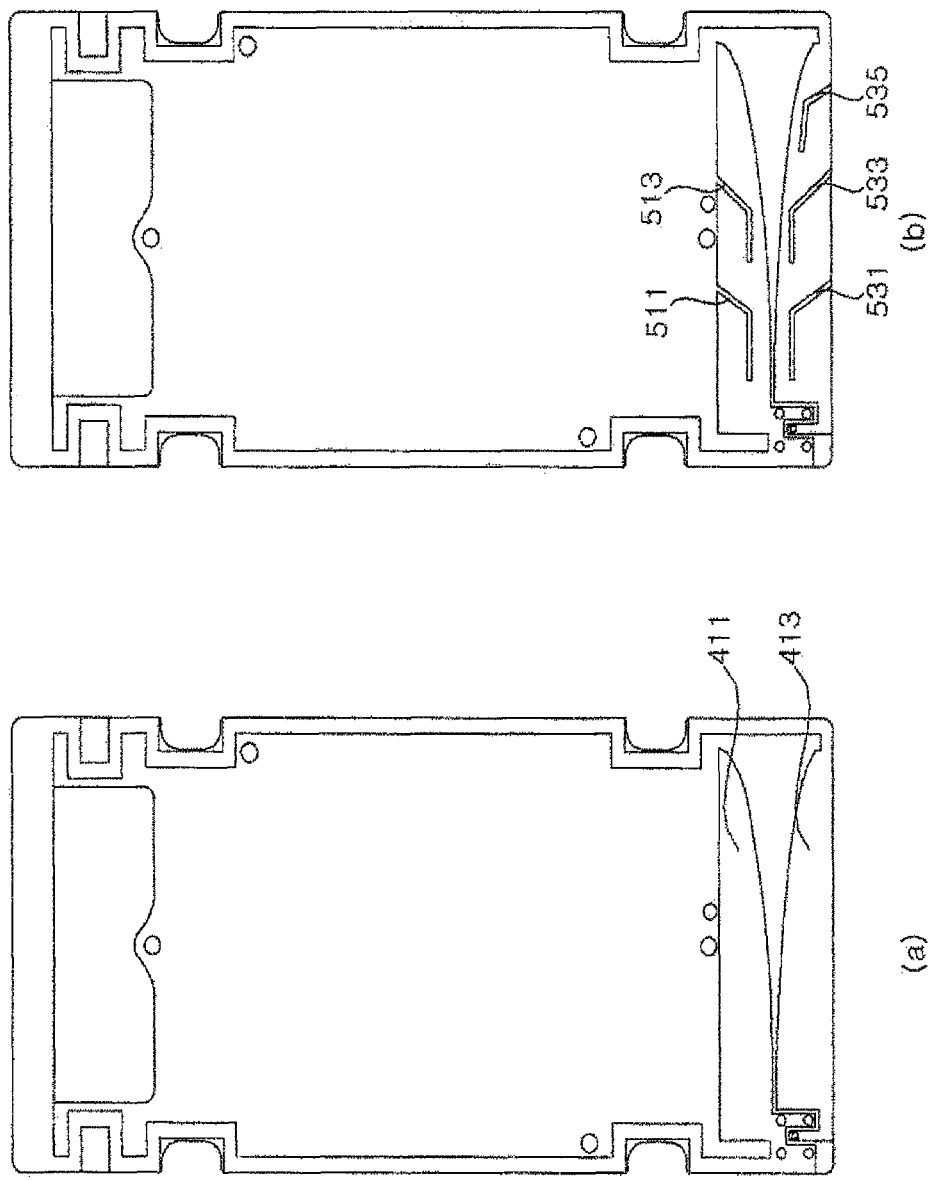
FIG. 10 is a diagram for describing an effect of slit structures included in the first extension pattern and the second extension pattern.
Figure 11:
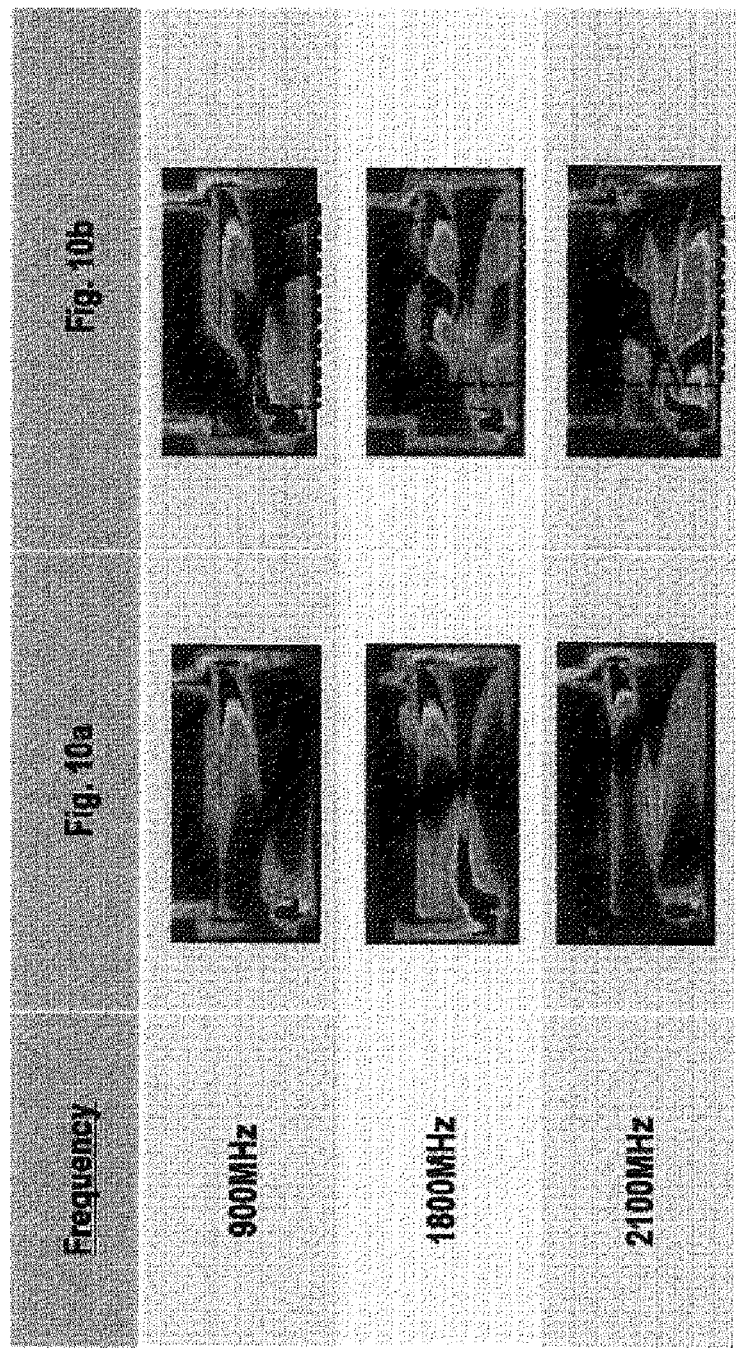
FIG. 11 is a diagram for describing an effect of the slit structures included in the first extension pattern and the second extension pattern.

FIGS. 10 and 11 are diagrams for describing an effect of the slit structures included in the first extension pattern and the second extension pattern.

Description is given with reference to the drawings. FIG. 10a is a diagram illustrating an antenna pattern when the re-radiation antenna 200 includes only the first extension pattern 411 and the second extension pattern 413. FIG. 10b is a diagram illustrating an antenna pattern when the re-radiation antenna 200 includes the slit structures 511, 513, 531, 533, and 535 within the first extension pattern 411 and the second extension pattern 413.

Furthermore, FIG. 11 is a diagram illustrating a distribution of electric fields (E-Fields) for each frequency band of the re-radiation antenna of FIG. 10. In FIG. 11, a bright portion means that electric fields having high intensity are distributed. As the intensity of the electric field is increased, transmission and reception efficiency of a signal is high.

In FIG. 11, it can be seen that the electric field of the re-radiation antenna 200 of FIG. 10b has a greater size than that of the re-radiation antenna of FIG. 10a in all frequencies.

In particular, when the intensities of electric fields in portions where the top or bottom of the external terminal 600 is disposed are compared, it can be seen that the intensity of an electric field of the re-radiation antenna 200 of FIG. 10b is higher than the intensity of an electric field of the re-radiation antenna of FIG. 10a in all the frequencies (a dotted portion in FIG. 11).

That is, the wireless charging device 100 of the present disclosure has a more excellent effect in terms of the intensity of an electric field compared to the conventional re-radiation antenna.

Figure 12:
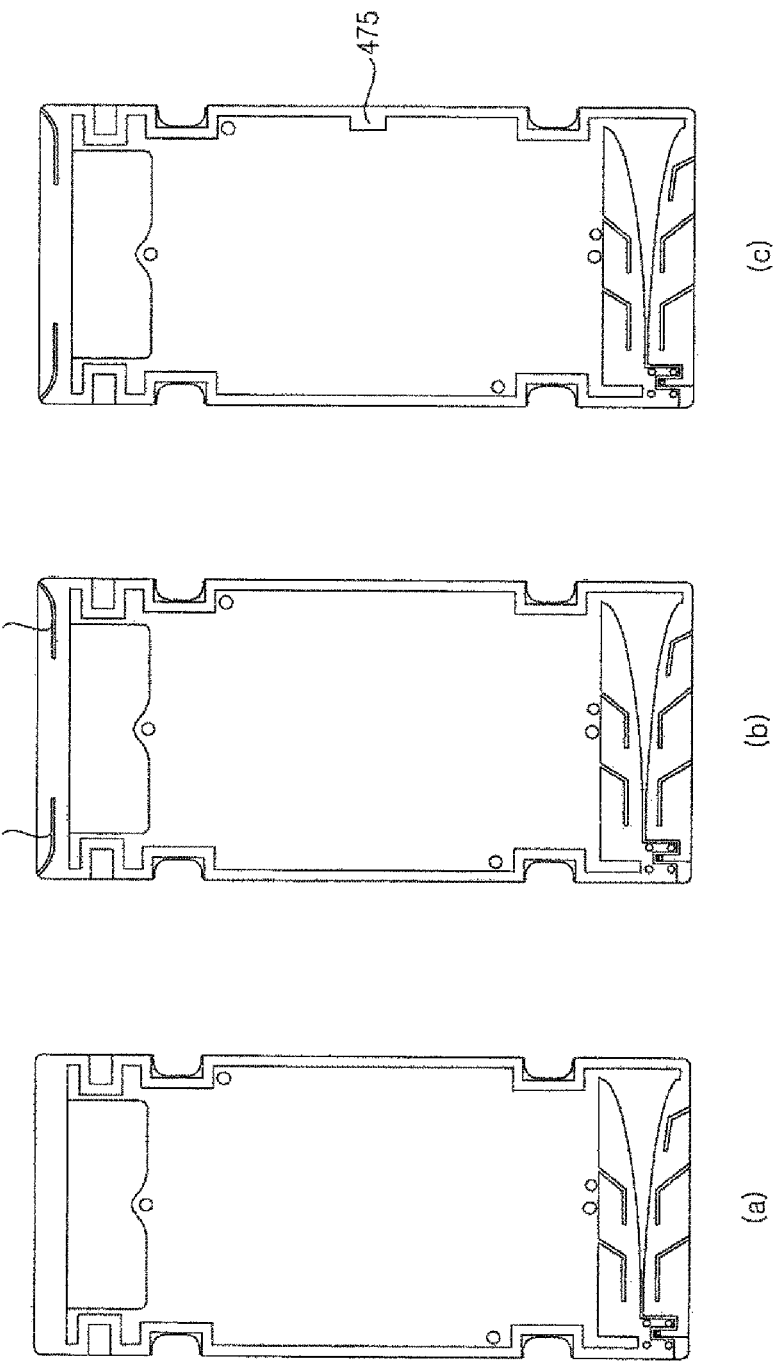
FIG. 12 is a diagram for describing an effect of slit structures of the second tape pattern and a protrusion pattern included in a third tape pattern.
Figure 13:
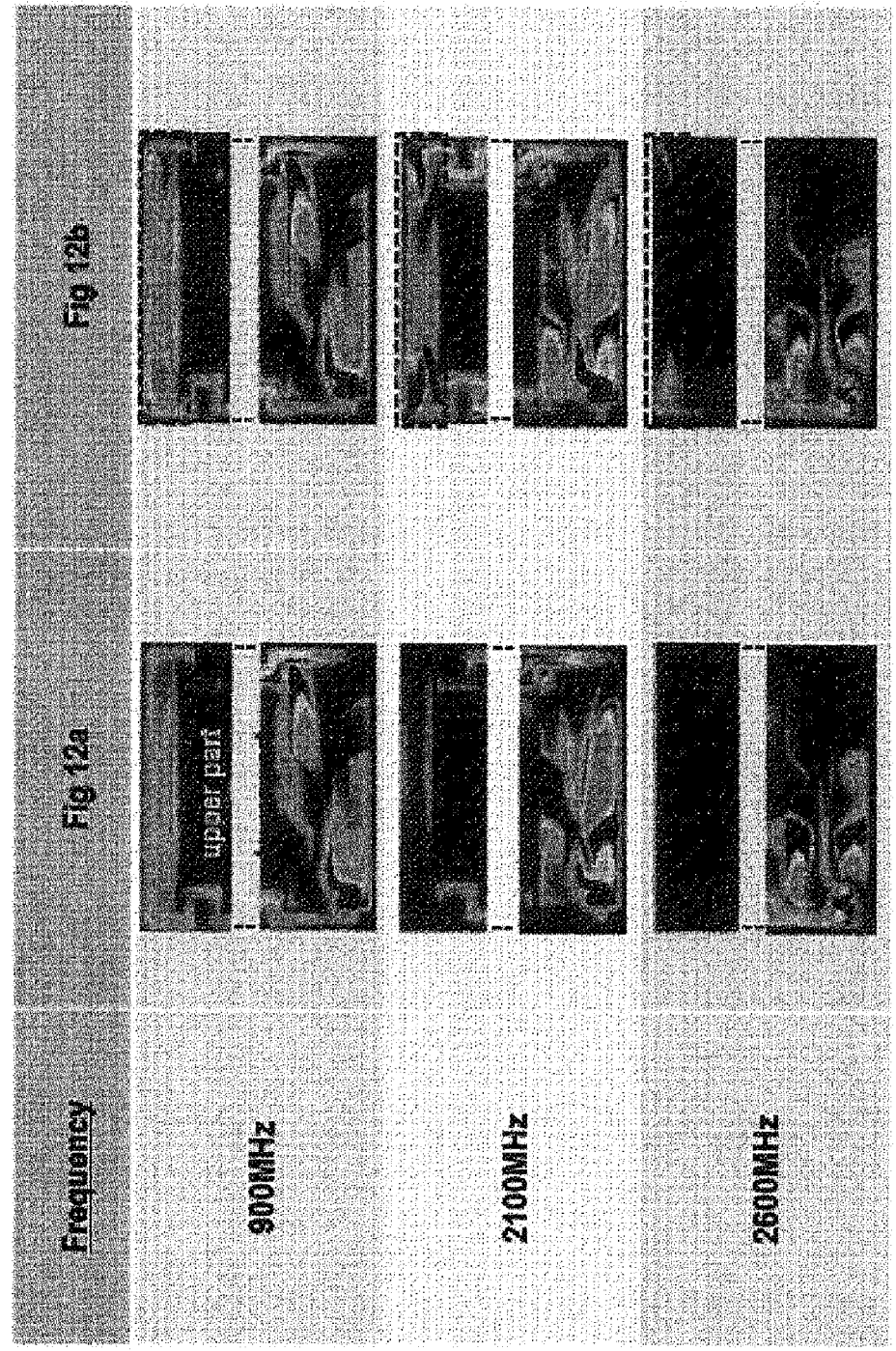
FIG. 13 is a diagram for describing an effect of the slit structures of the second tape pattern and the protrusion pattern included in the third tape pattern.
Figure 14:
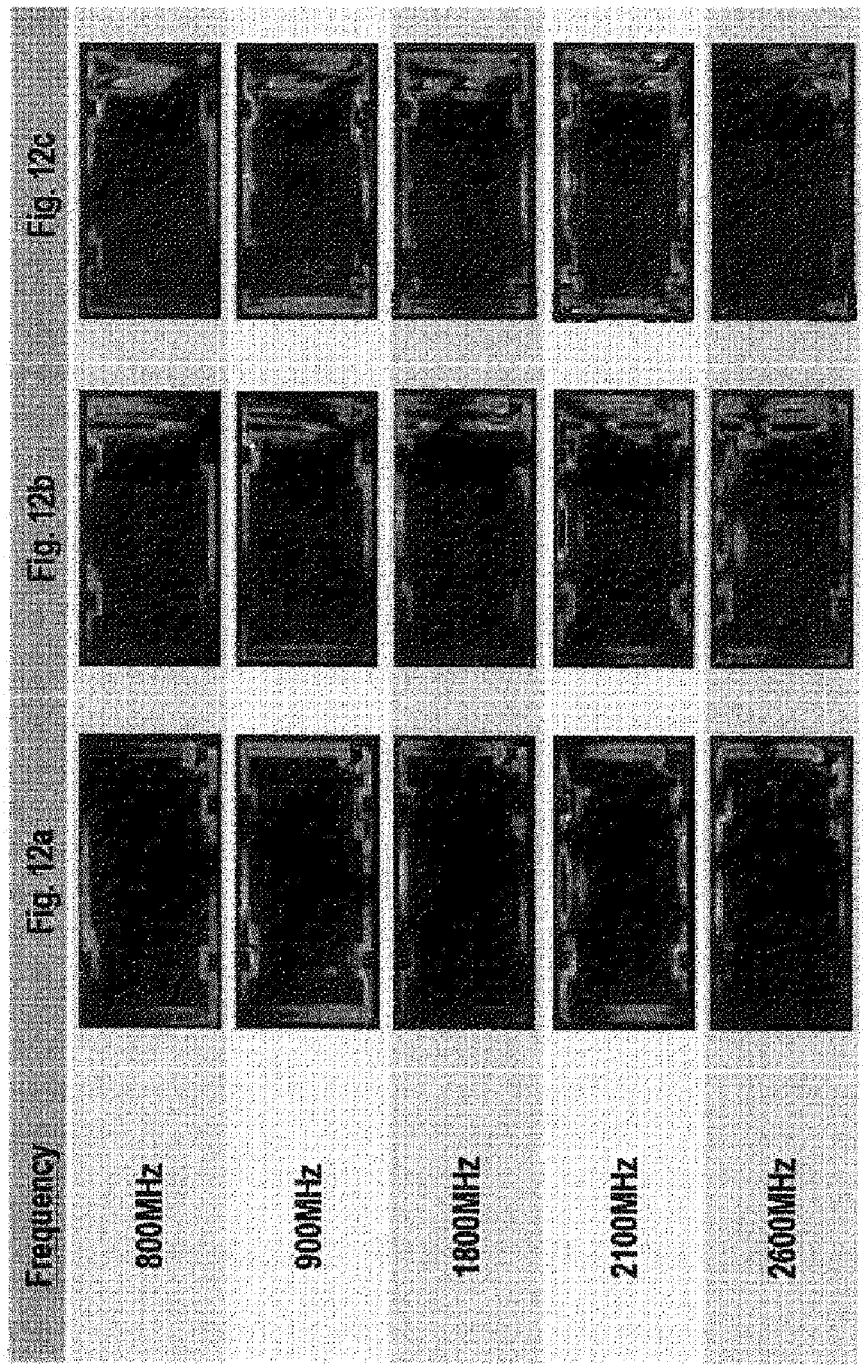
FIG. 14 is a diagram for describing an effect of the slit structures of the second tape pattern and the protrusion pattern included in the third tape pattern.

FIGS. 12 to 14 are diagrams for describing effects of the slit structures of the second tape pattern and the protrusion pattern included in the third tape pattern.

Description is given with reference to the drawings. FIG. 12a is a diagram illustrating an antenna pattern when the re-radiation antenna 200 includes only the slit structures 511, 513, 531, 533, and 535 within the first extension pattern 411 and the second extension pattern 413. FIG. 12b is a diagram illustrating an antenna pattern when the first assistant slit 610 and the second assistant slit 630 are further included in the second tape pattern 450. FIG. 12c is a diagram illustrating an antenna pattern when the protrusion pattern 475 is further included in the third tape pattern 470.

Furthermore, FIG. 13 is a diagram illustrating a distribution of electric fields for each frequency band of the re-radiation antenna of FIGS. 12a and 12b. FIG. 14 is a diagram for describing a distribution of electric fields for each frequency band of the re-radiation antenna of FIG. 12c.

In FIG. 12b, the first assistant slit 610 and the second assistant slit 630 are further included in the antenna pattern of FIG. 12.

In FIG. 13, it can be seen that the intensity of the electric field is higher in the second tape pattern 450 of FIG. 12b than in the second tape pattern 450 of FIG. 12a.

Furthermore, it can be seen that the electric fields are more uniformly distributed in the second tape pattern 450 of FIG. 12b than in the second tape pattern 450 of FIG. 12a.

Furthermore, when FIGS. 13 and 11 are compared, the first assistant slit 610 and the second assistant slit 630 do not affect the intensities of electric fields in the first extension pattern 411 and the second extension pattern 413 because the first assistant slit 610 and the second assistant slit 630 are disposed away from the first extension pattern 411 and the second extension pattern 413.

That is, it can be seen that an electric field is more uniformly emitted and the intensity of the electric field is higher in FIG. 12b than in FIG. 12a.

Meanwhile, in FIG. 14, as the third pattern 470 further includes the protrusion pattern 475, a distribution of electric fields in the third pattern 470 may become further uniform. Furthermore, as the protrusion pattern 475 includes only the third pattern 470, transmission efficiency of wireless power is not deteriorated.

As described above, the wireless charging device 100 of the present disclosure can increase the intensity of an electric field while not deteriorating transmission efficiency of wireless power, and can improve communication efficiency by making uniform a distribution of electric fields.

FIG. 15 is a diagram illustrating the state in which the external terminal has been held in the wireless charging device. FIG. 16 is a diagram for comparing communication efficiencies in a direction in which the external terminal is held.

Description is given with reference to the drawings. In general, the main antenna of the external terminal 600 is disposed on the lower side of the external terminal 600 because the main antenna is disposed away from the brain of a user as far as possible in order to prevent electromagnetic waves, etc.

When the external terminal 600 is held on the wireless charging device 100, the lower side of the external terminal 600 may be disposed on the side where the extension patterns 411 and 413 of the re-radiation antenna 200 as in FIG. 15a or the lower side of the external terminal 600 may be disposed on the side opposite to the extension patterns 411 and 413 of the re-radiation antenna 200 as in FIG. 15b depending on the holding direction.

As described above, since the main antenna is disposed on the lower side of the external terminal 600, communication efficiency may be different in the direction in which the external terminal 600 is held.

Although a user holds the external terminal 600 in any direction, communication efficiency having a given reference or more needs to be guaranteed. Accordingly, it is necessary to check performance of the wireless charging device 100 in the backward direction (FIG. 15b) in addition to the forward direction (FIG. 15a).

FIG. 16a is a table illustrating signal losses in the holding direction of the external terminal 600 in the conventional antenna pattern of FIG. 8a. FIG. 16b is a table illustrating signal losses in the holding direction of the external terminal 600 in the antenna pattern of the present disclosure.

In FIG. 16b, it can be seen that the re-radiation antenna 200 of the present disclosure showed signal losses 20.2 dB and 21.5 dB in LTE 2600, but had a signal an average signal loss of 13.4 dB in a full band.

In contrast, in FIG. 16a, the conventional re-radiation antenna does not have a problem in LTE 800 and LTE 900, but a signal loss in the backward direction was increased up to 19.4 dB in LTE 1800 and even a signal loss in the forward direction was significantly great in LTE 2100 and LTE 2600 compared to the re-radiation antenna of the present disclosure. Furthermore, it can be seen that the conventional re-radiation antenna had an average signal loss of 15.7 dB.

As a result, the re-radiation antenna 200 of the present disclosure is the re-radiation antenna 200 in which an average signal loss is 13.4 dB in a full band, and has excellent performance.

It is to be understood that the accompanying drawings are merely intended to make easily understood the embodiments disclosed in this specification, and the technical spirit disclosed in this specification is not restricted by the accompanying drawings and includes all changes, equivalents, and substitutions which fall within the spirit and technical scope of the present disclosure.

Likewise, the operations are described in the drawings in a specific sequence, but it should not be understood that such operations must be performed or all the illustrated operations must be performed in the illustrated specific sequence or sequential order in order to obtain preferred results. In a specific case, multi-tasking and parallel processing may be advantageous.

Furthermore, although the preferred embodiments of the present disclosure have been illustrated and described above, the present disclosure is not limited to the aforementioned specific embodiments, and a person having ordinary knowledge in the art to which the present disclosure pertains may modify the present disclosure in various ways without departing from the gist of the present disclosure in the claims. Such modified embodiments should not be individually understood from the technical spirit or prospect of this specification.

What is claimed is:

1. A wireless charging device comprising a power transmission coil wirelessly transmitting power to an external terminal and a re-radiation antenna receiving an antenna signal and re-radiating the antenna signal, wherein the re-radiation antenna comprises:
   an insulating plate; and
   a radiation pattern unit formed on one surface of the insulating plate, disposed along an outer circumference of the insulating plate, and having one end and the other end thereof disposed adjacent to each other,
   wherein the radiation pattern unit comprises:
   a first extension pattern having a quarter ellipse shape and elongated in a direction lateral to the insulating plate at a location adjacent to the one end of the radiation pattern unit, and
   a second extension pattern having a quarter ellipse shape and being symmetrical to the first extension pattern at a location adjacent to the other end of the radiation pattern.

2. The wireless charging device of claim 1, wherein the insulating plate comprises a plurality of opening units, each one having a quadrangle shape, penetrated up and down at a location isolated from each edge portion of the quadrangle at a given interval and laterally opened.

3. The wireless charging device of claim 2, wherein the insulating plate further comprises a through hole on an upper side of the insulating plate.

4. The wireless charging device of claim 1, wherein:
   the one end and the other end of the radiation pattern unit are disposed adjacent to a one-side edge of a lower side of the insulating plate, and
   the first extension pattern and the second extension pattern are transversely elongated toward the other side of the lower side of the insulating plate.

5. The wireless charging device of claim 1, wherein the first extension pattern and the second extension pattern are symmetrically formed so that curved portions of the quarter ellipse shapes face each other.

6. The wireless charging device of claim 1, wherein the first extension pattern comprises a first main slit and a second main slit formed therein so that the insulating plate is exposed.

7. The wireless charging device of claim 6, wherein:
   the first main slit comprises a first main exposure unit elongated in a diagonal direction from a straight-line portion of the quarter ellipse shape, and a second main exposure unit elongated in a direction lateral to the insulating plate from the first main exposure unit, and
   the second main slit comprises a third main exposure unit isolated from the first main exposure unit at a first interval and elongated in a diagonal direction from the straight-line portion of the quarter ellipse shape, and a fourth main exposure unit elongated in the direction lateral to the insulating plate from the third main exposure unit.

8. The wireless charging device of claim 7, wherein the second extension pattern comprises a third main slit, a fourth main slit, and a fifth main slit formed therein so that the insulating plate is exposed.

9. The wireless charging device of claim 8, wherein:
the third main slit comprises a fifth main exposure unit elongated in a diagonal direction from a lower end of the insulating plate, and a sixth main exposure unit elongated in the direction lateral to the insulating plate from the fifth main exposure unit,
the fourth main slit comprises a seventh main exposure unit isolated from the fifth main exposure unit at a second interval and elongated in a diagonal direction from the lower end of the insulating plate, and an eighth main exposure unit elongated in the direction lateral to the insulating plate from the seventh main exposure unit, and
the fifth main slit comprises a ninth main exposure unit isolated from the seventh main exposure unit at the second interval and elongated in a diagonal direction from the lower end of the insulating plate, and a tenth main exposure unit obliquely elongated from the ninth main exposure unit while forming an obtuse angle.

10. The wireless charging device of claim 9, wherein the first interval and the second interval are identical.

11. The wireless charging device of claim 1, wherein the radiation pattern unit comprises:
a first tape pattern longitudinally elongated along a one-side circumference of the insulating plate from the one end of the radiation pattern unit,
a second tape pattern transversely elongated along a top circumference of the insulating plate from the first tape pattern, and
a third tape pattern longitudinally elongate along the other-side circumference of the insulating plate from the second tape pattern.

12. The wireless charging device of claim 11, wherein the second tape pattern comprises a first assistant slit and a second assistant slit formed so that the insulating plate is exposed.

13. The wireless charging device of claim 12, wherein:
the first assistant slit comprises a first assistant exposure unit elongated in a curve shape from a one-side edge of the insulating plate, and a second assistant exposure unit elongated in the direction lateral to the insulating plate from the first assistant exposure unit, and
the second assistant slit comprises a third assistant exposure unit elongated in a curve shape from the other-side edge of the insulating plate, and a fourth assistant exposure unit elongated in the direction lateral to the insulating plate from the third assistant exposure unit.

14. The wireless charging device of claim 11, wherein a width of the second tape pattern is greater than a width of each of the first tape pattern and the third tape pattern.

15. The wireless charging device of claim 11, wherein the first tape pattern and the third tape pattern comprise a first meander pattern and a second meander pattern formed in meander shapes, respectively, in a bilateral symmetry manner with respect to a center line in a longitudinal direction of the insulating plate on the upper side of the insulating plate.

16. The wireless charging device of claim 11, wherein the third tape pattern comprises at least one protrusion pattern protruded in a direction toward an inside of the insulating plate in a middle of the insulating plate.

17. The wireless charging device of claim 16, wherein a length and width of the protrusion pattern and a number of protrusion patterns are set based on a correction of an electrical length and an intensity of an electric field (E-field).

18. The wireless charging device of claim 1, further comprising:
a ground unit connected to the one end of the radiation pattern unit; and
a power supply unit connected to the other end of the radiation pattern unit and supplying power.

19. The wireless charging device of claim 1, wherein each of the first extension pattern and the second extension pattern comprises a plurality of main slits disposed in a length direction of the quarter ellipse.

20. The wireless charging device of claim 19, wherein a number of main slits of the first extension pattern is different from a number of main slits of the second extension pattern.

* * * * *